United States Patent
Fuller et al.

(10) Patent No.: US 6,671,079 B2
(45) Date of Patent: Dec. 30, 2003

(54) METHOD AND APPARATUS FOR TRANSMITTING A MODULATED OPTICAL SIGNAL

(75) Inventors: Richard Clair Fuller, Fair Haven, NJ (US); Yuan-Hua Kao, Holmdel, NJ (US); Frank J. Peragine, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/016,904

(22) Filed: Dec. 14, 2001

(65) Prior Publication Data

US 2003/0112487 A1 Jun. 19, 2003

(51) Int. Cl.[7] .............................. G02F 1/03; G02F 1/07; G02F 1/01; G02F 1/035
(52) U.S. Cl. ........................... 359/264; 385/1; 359/181; 359/183
(58) Field of Search ................................ 359/264, 259, 359/237, 239, 246, 279, 238, 248, 299, 181, 183; 385/1, 2

(56) References Cited

U.S. PATENT DOCUMENTS

| | | | |
|---|---|---|---|
| 3,946,385 A | * 3/1976 | Ewen | 342/386 |
| 5,208,817 A | * 5/1993 | Kao et al. | 372/26 |
| 5,400,417 A | 3/1995 | Allie et al. | 385/2 |
| 5,453,608 A | 9/1995 | Conder et al. | 250/205 |
| 5,477,375 A | 12/1995 | Korotky et al. | 359/264 |
| 5,625,722 A | * 4/1997 | Froberg et al. | 385/1 |
| 6,204,954 B1 | 3/2001 | Nagarajan | 359/279 |

OTHER PUBLICATIONS

USSN 09/356,297, filed Jul. 16, 1999, Dorschky et al. inventors, entitled Method and Apparatus for Generating a Return to Zero Signal.

* cited by examiner

Primary Examiner—Hung Xuan Dang
Assistant Examiner—Joseph Martinez

(57) ABSTRACT

A method and apparatus for transmitting a modulated optical signal includes a continuous source of light, a first optical modulator for generating an optical pulse stream in response to a radio frequency (RF) driving signal and a DC bias signal, and a second modulator for modulating the optical pulse stream with an electrical data signal. A processor dithers the phase of the RF driving signal using a first dither signal and the level of the DC bias signal using a second dither signal. The processor detects the first and/or second dither signals in the modulated optical signal and adjusts the phase of the RF driving signal and/or level of the DC bias signal to null the detected first and/or second dither signal.

20 Claims, 6 Drawing Sheets

TRANSFER CHARACTERISTICS

METHOD AND APPARATUS FOR TRANSMITTING A MODULATED OPTICAL SIGNAL

BACKGROUND OF THE INVENTION

1. Field of the Invention

The present invention generally relates to lightwave transmission systems and, more particularly, a method and apparatus for transmitting an undistorted optical return-to-zero signal using dither signals.

2. Description of the Related Art

In the propagation of optical pulses in ultra-long haul applications, such as transoceanic transmission, numerous parameters associated with such transmission limit the capacity of the optical fiber cable system through which the optical pulses are transmitted. As known in the art, optical fibers are not strictly linear, but have a small amount of nonlinearity in their transmission characteristics. This nonlinearity makes possible a pulse transmission mode in the optical fiber that is effectively immune from the aforementioned pulse degradation factors. This mode, known in the art as "soliton propagation", effectively balances out the aforementioned factors provided that the pulses have a required power level. In addition, the pulses must have a pulse shape in both the time and frequency domains that is optimum for compensating dispersion at a given power level and for reducing interference and cross-talk among pulses.

In lightwave transmission systems, optical pulses are generated using optical modulators, such as Mach-Zehnder Modulators. The optical modulators are driven by a radio frequency (RF) driving signal and are biased by a DC bias signal so as to generate a stream of optical pulses for transmitting information. The optical pulses are Gaussian shaped and thus suitable for dispersion-managed soliton applications. Such a system is described in U.S. Pat. No. 5,477,375, issued Dec. 19, 1995, to Korotky et al, which is herein incorporated by reference. In such a lightwave transmission system, if the RF driving signal and/or the DC bias signal are less than optimal, then the pulse shape of the optical output pulses will be distorted, reducing or eliminating their effectiveness in ultra-long haul transmission applications.

Therefore, there exists a need in the art for a method and apparatus for reducing distortion in the optical output pulses of a lightwave transmission system.

SUMMARY OF THE INVENTION

The disadvantages associated with the prior art are overcome by a method and apparatus for transmitting a modulated optical signal comprising a continuous source of light, a first optical modulator for generating an optical pulse stream in response to a radio frequency (RF) driving signal and a DC bias signal, and a second optical modulator for modulating the optical pulse stream with an electrical data signal. A processor dithers the phase of the RF driving signal using a first dither signal and the level of the DC bias signal using a second dither signal. The processor detects the first and/or second dither signals in the modulated optical signal and adjusts the phase of the RF driving signal and/or level of the DC bias signal to null the detected first and/or second dither signals. In one embodiment of the invention, the dither signals comprise low-level audio tones.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention will be described within the context of a lightwave transmission system that advantageously employs dither signals to produce a data modulated return-to-zero (RZ) optical signal having complete and undistorted optical pulses for ultra-long haul applications (e.g., solitons for dispersion-managed applications). Specifically, the dither signals are used for aligning the phase and optimally biasing optical modulators within the lightwave transmission system. In one embodiment of the invention, the dither signals are low-level audio tones that can be easily generated and processed with low cost circuitry. The applied audio tones are low in level and add little degradation to the output optical pulses. The dither signals are detected in the optical output of the lightwave transmission system and are nulled by adjusting the phase alignment and bias of the optical modulators. It will be appreciated by those skilled in the art that the invention finds broad applications in other contexts, such as optical signal transmissions over short or medium distances.

Figure 1:
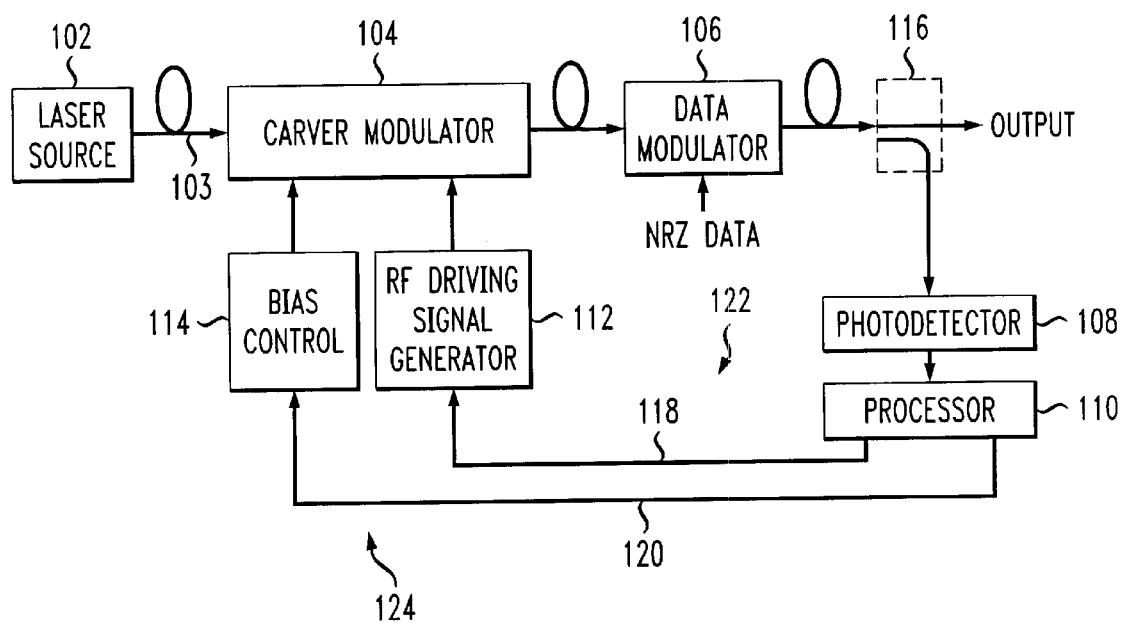
FIG. 1 depicts a high-level block diagram of a lightwave transmission system of the present invention.
Figures 4A, 4B, 4C:
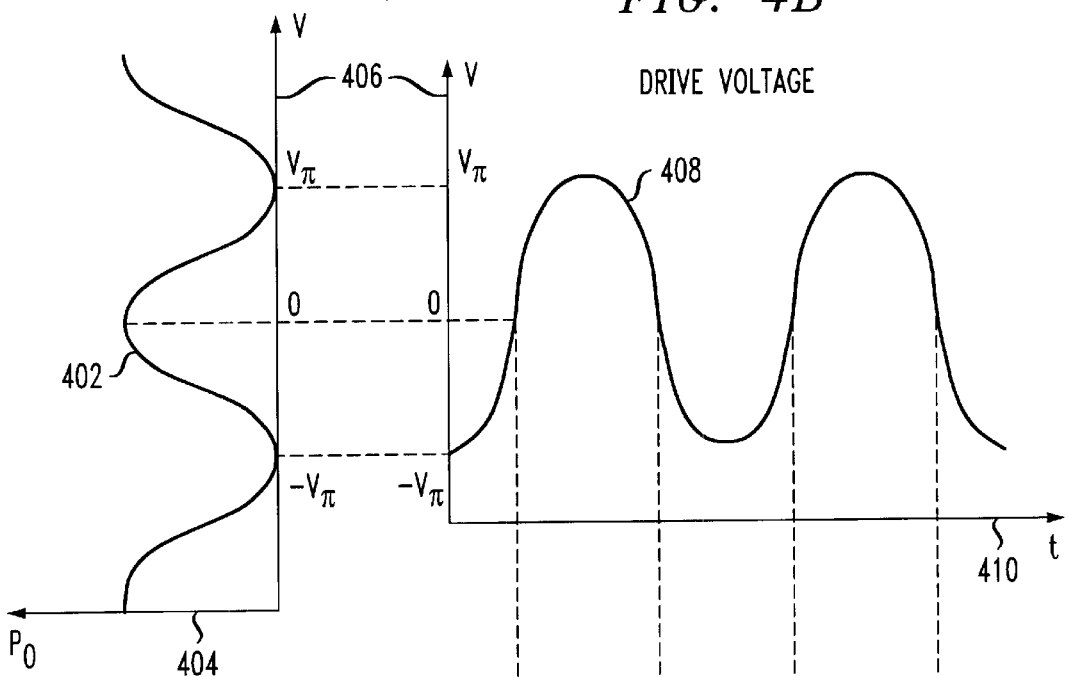
FIGS. 4a–c show the relation between a radio frequency driving voltage, a transfer function of an optical modulator, and an optical signal generated by the optical modulator, where the optical modulator is optimally biased.

FIG. 1 depicts a high-level block diagram of a lightwave transmission system 100 of the present invention. The system 100 comprises a laser source 102, a carver modulator 104, a data modulator 106, a photodetector 108, a processor 110, a radio frequency (RF) driving signal generator 112, and a bias control circuit 114. The laser source 102 operates in a continuous wave (CW) mode to produce light at a predetermined transmission wavelength for the lightwave transmission system 100. Light from the laser source 102 is coupled to the carver modulator 104 via optical fiber 103. The carver modulator 104 is an optical modulator of the type that has a nonlinear and periodic transfer function (i.e, the optical power output varies periodically with increasing input voltage). Specifically, the transfer function has a minimum optical output at a first voltage driving level, a minimum optical output at a second voltage driving level, and a peak optical output at a voltage level between the first and second voltage driving levels. An interferometer, such as a Mach-Zehnder interferometer (MZI), or a directional coupler, for example, is appropriate for use with the present invention. An exemplary transfer function for a Mach-Zehnder modulator (MZM) is shown in FIG. 4a.

The RF driving signal generator 112 provides an RF driving signal to the carver modulator 104. As described more fully below, the peak-to-peak amplitude of the RF driving signal is such that the RF driving signal precisely oscillates between the first voltage driving level and the second voltage driving level of the carver modulator 104 transfer function (a condition known as driving the carver modulator 104 from valley-to-valley, that is, minimum optical output to minimum optical output). When the carver modulator 104 is properly biased, the zeros of the RF driving signal correspond to the voltage level on the transfer function that results in peak optical output. The bias control circuit 114 provides the DC bias to the carver modulator 104 for placing the zeros of the RF driving signal at the peak optical output position along the carver modulator 104 transfer function.

Once properly biased and driven, the carver modulator 104 produces an optical pulse stream (i.e., an RZ optical signal) having a pulse frequency in accordance with the bit rate of the system 100 (e.g., 10 Gbit/s or twice the frequency of the RF driving signal). The optical pulse stream generated by the carver modulator 104 is coupled to the data modulator 106. The data modulator 106 is an optical modulator, such as a Mach-Zehnder modulator, that modulates the optical pulse stream with an electrical non-return-to-zero (NRZ) data signal that represents the data to be transmitted. That is, the data modulator 106 acts like a switch to turn on or off specific ones of the optical pulses in the optical pulse stream in accordance with the bit stream of the electrical data signal.

For undistorted data modulation, the phase relationship between the optical pulse stream from the carver modulator 104 and the electrical data signal input to the data modulator 106 must be such that the optical pulses are aligned within the data signal eye (i.e., the pulse width of a bit of information in the data signal). The phase relationship is controlled by the phase of the RF driving signal. The output of the data modulator 106 is a data modulated RZ optical signal. The optical pulses present in the data modulated optical signal are of the type suitable for use in ultra-long haul applications (e.g., solitons).

Figure 3A:
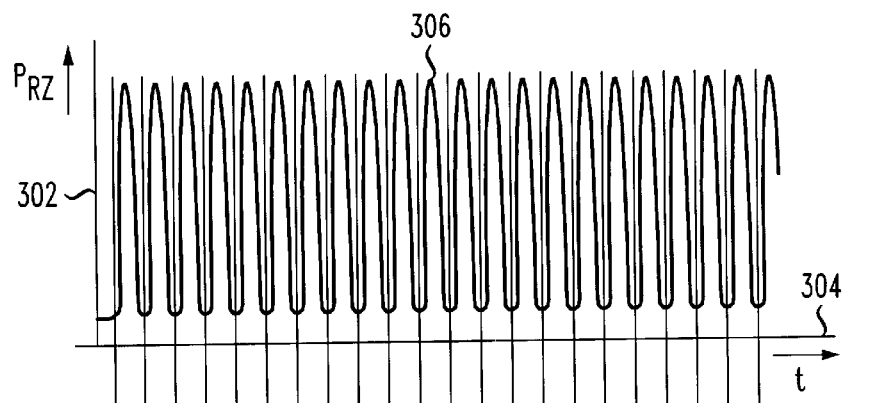
FIGS. 3a–c illustrate exemplary optical and electrical data waveforms having a common time axis.
Figure 3B:
Figure 3C:
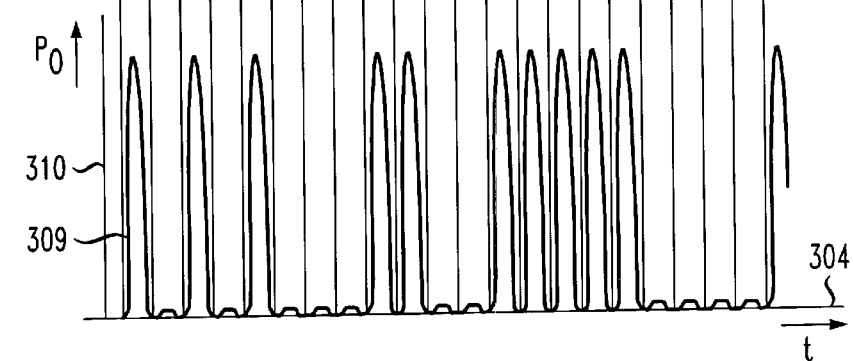

FIGS. 3a–c illustrate exemplary RZ and NRZ waveforms having a common horizontal time axis 304. Specifically, FIG. 3a shows an exemplary optical pulse stream 306 from the carver modulator 104, where vertical axis 302 represents optical power. FIG. 3b shows an exemplary NRZ data signal 307, where vertical axis 308 represents the output voltage. FIG. 3c shows an exemplary data modulated RZ optical signal 309 to be transmitted, where vertical axis 310 represents optical power. Lines 305 common to each graph demarcate time slots Δt where one bit of data is transmitted. The frequency of the time slots Δt is the bit rate of the system 100 (e.g., 10 Gbit's in the present embodiment).

As shown in FIG. 3, there is an optical pulse in the optical pulse stream 306 from the carver modulator 104 for each time slot Δt. The optical pulses are, for example, 33% duty cycle Gaussian shaped pulses suitable for use in ultra-long haul applications. As for the NRZ data signal 307, an electrical signal in a given time slot Δt having a first voltage level represents a logical '1', whereas an electrical signal having a second voltage level (e.g., 0 V) represents a logical '0'. The electrical pulses in the NRZ data signal 307 do not necessarily return to a zero voltage value in every time slot Δt, and can remain at a logical '0' or '1' for several time slots Δt. The modulated optical signal 309 illustrates the result of modulating the optical pulse stream 306 with the NRZ data signal 307. As shown, there is an optical pulse in the modulated optical signal 309 for each electrical pulse in the NRZ data signal 307 that represents a logical '1'. For each electrical pulse in the NRZ data signal 307 that represents a logical '0', the corresponding optical pulse in the optical pulse stream 306 from the carver modulator 104 is suppressed.

Returning to FIG. 1, in order to generate complete and undistorted optical pulses, the lightwave transmission system 100 continuously tracks the phase of the RF driving signal and the level of the DC bias to the carver modulator 104. Phase and bias errors can cause the carver and data modulators 104 and 106 to generate distorted optical signals. Specifically, the system 100 includes a phase control loop 122 and a bias control loop 124. The phase control loop 122 comprises the photodetector 108, the processor 110, and the RF driving signal generator 112. The bias control loop 124 comprises the photodetector 108, the processor 110, and the bias control circuit 114.

In the phase control loop 122, the processor 110 generates a phase adjustment signal 118 for adjusting the phase of the RF driving signal such that the carver modulator 104 generates optical pulses at a fixed phase relation with the NRZ data signal. That is, each optical pulse is within the data eye of each respective bit in the NRZ data signal. In the bias control loop 124, the processor 110 generates a bias adjustment signal 120 for adjusting the level of the DC bias such that the RF driving signal drives the carver modulator 104 from valley-to-valley and the zeros of the RF driving signal fall within the peak optical output of the carver modulator 104 transfer function. An optimal DC bias results in each optical pulse having an intensity starting at zero, rising to a maximum, and then returning to zero again, occurring at a frequency corresponding to the bit rate of the system 100.

Operation of the bias control loop 124 (i.e., photodetector 108, processor 110, and bias control circuit 114) is best understood by reference to FIGS. 4 and 5. FIG. 4 shows the relation between the RF driving voltage, the transfer function of the carver modulator 104, and the optical pulse stream generated by the carver modulator 104, where the carver modulator 104 is optimally biased. Specifically, FIG. 4a depicts the sinusoidal transfer function 402 of the carver modulator 104, where horizontal axis 404 represents optical power output (in wafts) and vertical axis 406 represents voltage input of the RF driving signal. In the example shown, the transfer function has a first minimum at a voltage $-V_\pi$, a second minimum at a voltage $V_\pi$, and a maximum between $-V_\pi$ and $V_\pi$ at 0 V. The voltage $V_\pi$ is known as the half-wave voltage of an MZM and is defined as the difference between the minimum and maximum output signal power. Since the transfer function is periodic, the voltage levels $-V_\pi$, 0, and $V_\pi$ are exemplary.

FIG. 4b depicts an RF driving signal 408, where horizontal axis 410 represents time and vertical axis 406 is common to that of FIG. 4a. When the carver modulator 104 is optimally biased, the zeros of the RF driving signal 408 occur at the maximum optical output along the transfer function 402. The RF driving signal 408 oscillates between $-V_\pi$ and $V_\pi$ (i.e., the RF driving signal 408 has a peak-to-peak voltage of $2V_\pi$). The AGC input of the amplifier 210 is used to precisely set the level of the RF driving signal 408 at the $2V_\pi$ level.

FIG. 4c shows an optical pulse stream 412 that is generated at the output of the carver modulator 104, where vertical axis 414 represents optical power and horizontal axis 410 is common to that of FIG. 4b. The optical pulse stream 412 has an optical pulse frequency of twice the frequency of the RF driving signal 408. Thus, in the present embodiment, the RF driving signal has a frequency of 5332.1 MHz and Lathe optical pulse stream at the output of the carver modulator 104 has an optical pulse frequency of 10,664.2 MHz (i.e., the bit rate of the system).

Figure 5A:
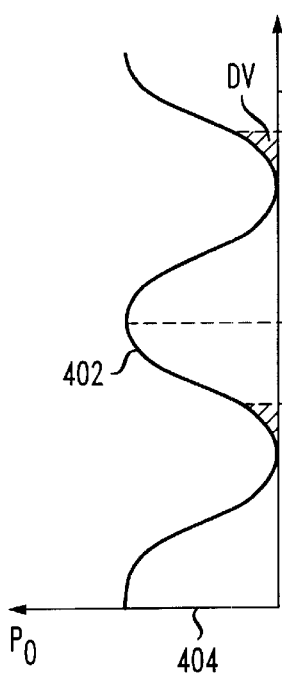
FIGS. 5a–c show the relation between a radio frequency driving voltage, a transfer function of an optical modulator, and an optical signal generated by the optical modulator, where the bias of the optical modulator has drifted from the optimal point.
Figure 5B:
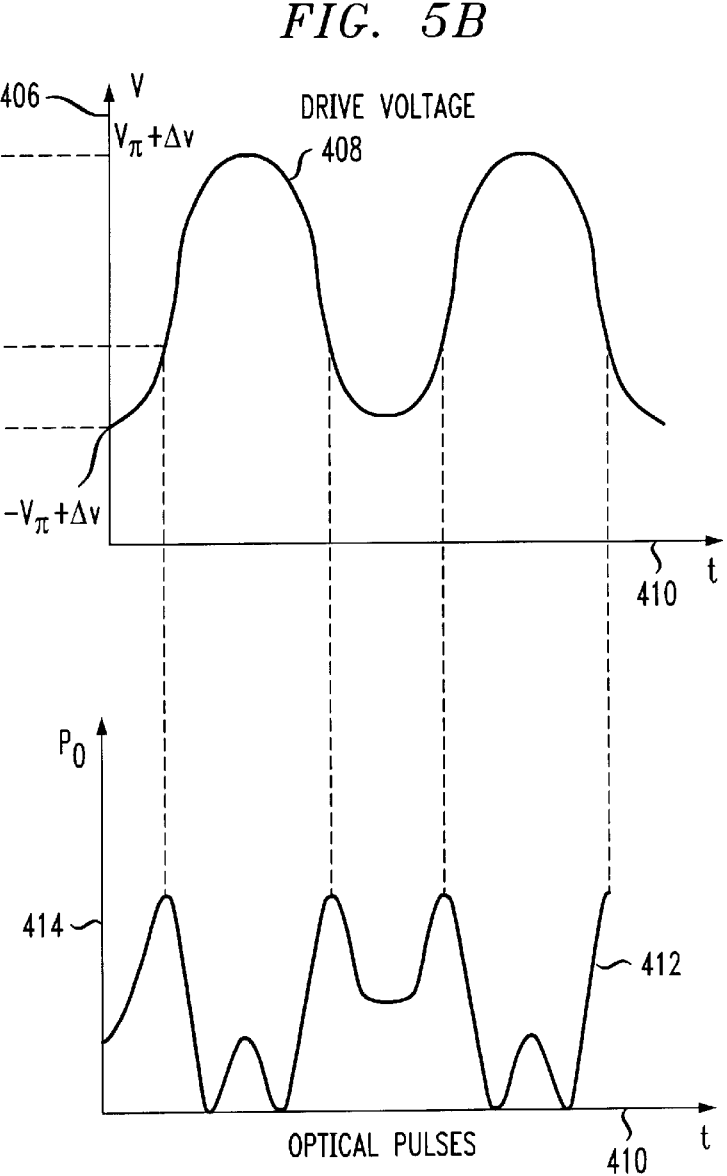
Figure 5C:
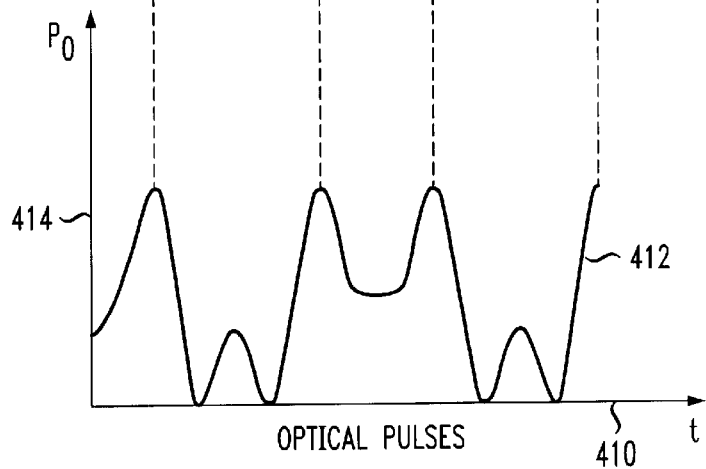

FIG. 5 shows the relation between the RF driving voltage, the transfer function of the carver modulator 104, and the optical pulse stream generated by the carver modulator 104, where the bias of the carver modulator 104 has drifted away from the optimal point. Specifically, FIG. 5a shows the transfer function 402 of the carver modulator 104 shifted from the optimal bias point by a voltage Δv. FIG. 5b shows the RF driving signal 408 and FIG. 5c shows the corresponding optical pulse stream 412. As shown, the bias shift Δv causes incomplete and distorted optical pulses in the output of the carver modulator 104 (there is a 5 GHz component in the optical pulse train, which nominally contains optical pulses only at 10 GHz). The zeros of the RF driving signal 408 are no longer at the peak optical output point on the transfer function 402. Thus, the present invention employs the bias control loop 124 to track the bias error as the bias of the carver modulator 104 drifts with life.

Figure 6A:
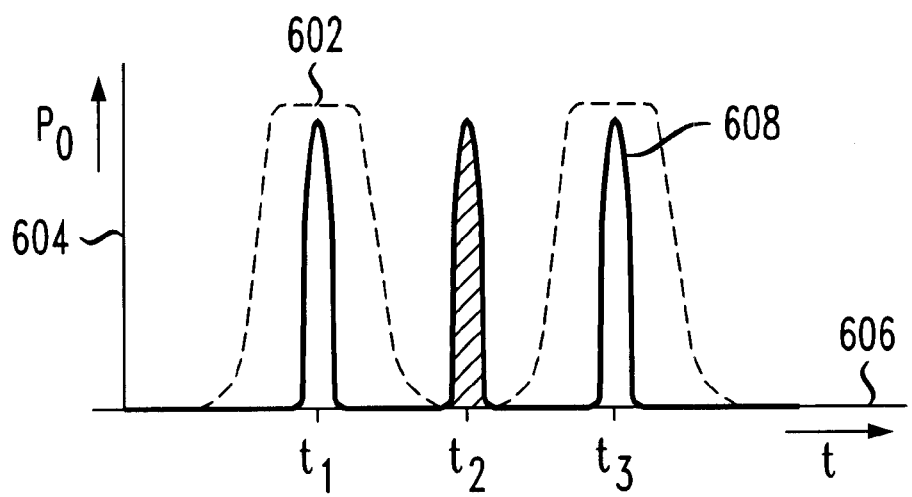
FIGS. 6a–b show graphs of an electrical data signal imposed over an optical signal.

Operation of the phase control loop 122 (i.e., the photodetector 108, the processor 110, and the RF driving signal generator 112) is best understood with reference to FIG. 6. Specifically, FIG. 6a shows and illustrative NRZ data signal 602 imposed over an optical pulse stream 608 from the carver modulator 104, where axis 604 represents optical power and axis 606 represents time. As shown, the optical pulse stream 608 and the NRZ data signal 602 are phase aligned such that the optical pulses fall within the data eye of each bit of information in the NRZ data signal. At times $t_1$ and $t_3$, there are logical '1's in the NRZ data signal 602 and the optical pulses are transmitted. A time $t_2$, the NRZ data signal 602 is a logical '0' and the optical pulse is completely suppressed.

Figure 6B:
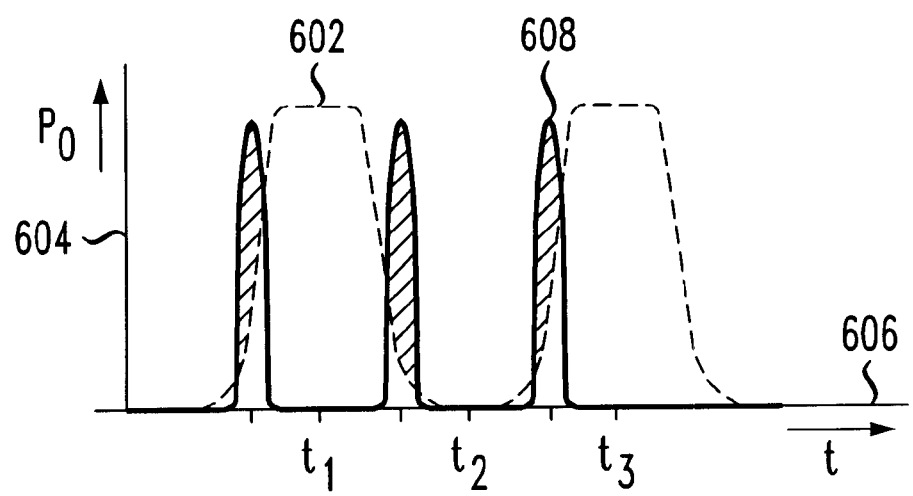

FIG. 6b shows the same graph as FIG. 6a except the NRZ data signal 602 and the optical pulse stream 608 are misaligned with respect to each other. The hatched areas indicate portions of the optical pulses of the optical pulse stream 608 that would have been transmitted but for the relative phase shift between the signals. The phase shift is due to a phase shift in the RF driving signal and results in incomplete and distorted optical pulses in the output. Thus, the present invention employs the phase control loop 122 to track the phase error as, for example, the phase of the RF driving signal shifts due to temperature changes in the components of the RF driving signal generator 112.

In accordance with the present invention, the processor 110 monitors the phase and bias errors by "dithering" the phase and bias adjustment signals 118 and 120 and detecting the dithers in the output of the system. Specifically, the processor 110 adds a first dither signal to the phase adjustment signal 118 and a second dither signal to the level of the bias adjustment signal 120. In one embodiment, the dither signals are constant, low-level, low-frequency RF signals, such as audio tones. As described more fully below, if the phase and/or bias dither signals are present at the output of the system 100, then there is a phase and/or bias error distorting the optical output signal. This phase and/or bias error can be eliminated by adjusting the phase and/or bias adjustment signals 118 and 120 to null the phase and/or bias dither signals in the output of the system 100. The phase and bias dither signals can be introduced and nulled simultaneously or individually. In the embodiment where the phase and bias dither signals are introduced and nulled individually, either the phase dither signal or the bias dither signal can first be introduced and when nulled, the remaining dither signal is then introduced and nulled. In yet another embodiment, the level of the dither signals can be increased as they are nulled to improve sensitivity.

Returning to FIG. 1, the photodetector 108 samples the output of the system 100 via directional coupler 116. If the photodetector 108 detects the bias dither signal, the processor 110 adjusts the bias adjustment signal 120 to null out the bias dither signal. If the photodetector 108 detects the phase dither signal, the processor 110 adjusts the phase adjustment signal 118 to null out the phase dither signal. In this manner, the present invention generates complete and undistorted optical pulses in the data modulated RZ optical signal.

Figure 2:
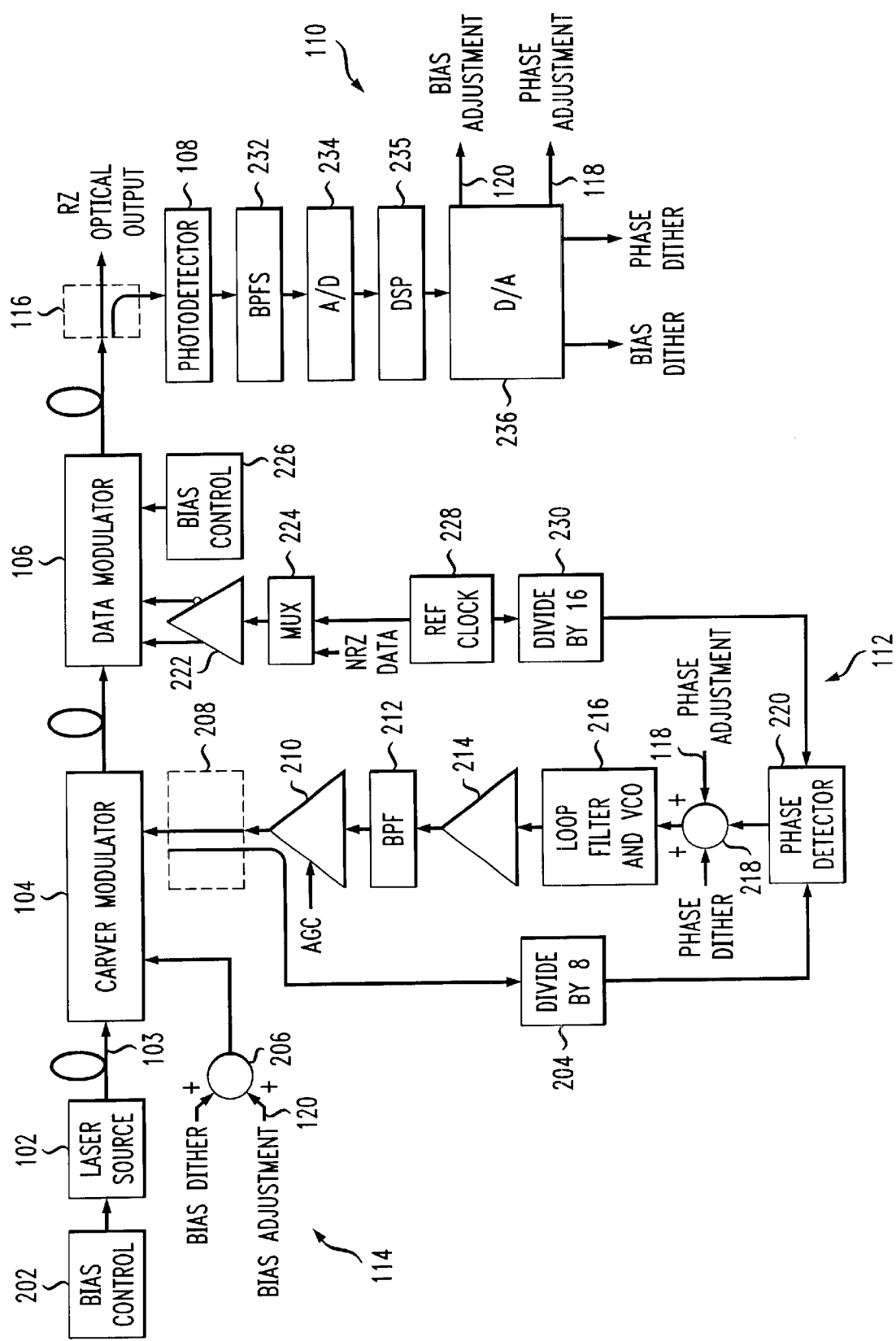
FIG. 2 depicts a more detailed block diagram showing one embodiment of the lightwave transmission system of FIG. 1.

FIG. 2 depicts a more detailed block diagram showing one embodiment of the lightwave transmission system 100 according to the present invention. Elements of FIG. 2 that are similar to those of FIG. 1 are identified using identical reference characters. In the embodiment shown, the laser 102 operates in the CW mode Sunder control of bias control circuit 202. For long wavelength systems, the laser 102 can be an InGaAsP/InP semiconductor single mode laser operating nominally at 1.55 μm, for example. The carver modulator 104 comprises a MZM, the transfer function of which is illustrated in FIG. 4a. The data modulator 106 also comprises a MZM, which is biased via bias control circuit 226. The bias control circuit 226 can be a standard bias control circuit typically used with NRZ modulators. The bias control circuit 226 operates independently of all other control circuits and is used to ensure operation of the data modulator 106 at the bias point for optimal switching extinction ratio (i.e., nearly no optical pulse is transmitted for a logical '0' in the NRZ data signal).

An NRZ data source (not shown) is coupled to multiplexer (MUX) 224. The MUX 224 multiplexes the NRZ data signal with the output of a reference clock 228. The reference clock 228 operates at the bit rate of the system 100 (e.g., 10,664.2 MHz for a 10 Gbit/s system). The output of the MUX 224 is coupled to an amplifier 222 having two output leads, one of which is inverted. Although two output leads are not required, use of two output leads instead of one allows a lower voltage operation and produces substantially zero chirp transform limited optical signals. The two outputs of the amplifier 222 are coupled to the data modulator 106 along with the output of the bias control circuit 226. As described above, the data modulator acts as a switch to turn the optical pulses in the optical pulse stream on and off in accordance with the NRZ data signal provided by the amplifier 222.

To generate the optical pulse stream at the output of the carver modulator 104, the carver modulator 104 is coupled to the bias control circuit 114 and the RF driving signal generator 112, as described above. In the present embodiment, the bias control circuit 114 comprises adder 206, which has as inputs a bias dither signal and a bias adjustment signal. The resulting output of the adder 206 is a dithered DC bias signal suitable for biasing the carver modulator 104. The RF driving signal generator 112 comprises a phase detector 220, an adder 218, a combined loop filter and voltage controlled oscillator (VCO) circuit 216, a band-pass filter 212, and amplifiers 210 and 214. A directional coupler 208 provides a sample of the RF driving signal to a divide-by-8 counter circuit 204. The output of the divide-by-8 counter circuit 204 is coupled to one input of the phase detector 220. A second input of the phase detector 220 is coupled to a divide-by-16 counter circuit 230, which is in turn is coupled to the Preference clock 228.

In operation, the RF driving signal generator 112 produces an RF driving signal to be coupled to the carver modulator 104. The RF driving signal has a frequency that is half the bit rate frequency (illustratively 5332.1 MHz for a 10 Gbit/s system) and is generated in a frequency synthesizer loop using the signal from the preference clock 228 as a reference. Specifically, the reference clock 228 generates a digital clock signal having a frequency of 10,664.2 MHz. The digital clock signal is coupled to the divide-by-16 counter circuit 230 that generates as output a 666.5 MHz clock signal. The directional coupler 208 provides a sample of the RF driving signal to the divide-by-8 counter circuit 204, which also generates a 666.5 MHz signal as output. The counter circuits 204 and 230 convert the frequency of their respective input signals to a common frequency (666.5 MHz in the present example) for phase comparison in the phase detector 220.

The phase detector 220 generates a phase error signal that is coupled to the adder 218. The adder 218 combines the phase error, a phase dither signal, and a phase adjustment signal, and couples the result to the combined loop filter and VCO circuit 216. The VCO oscillates at 5332.1 MHz and the phase of its output signal is controlled by the output of the adder 218. The 5332.1 MHz RF driving signal is than pre-amplified by amplifier 214, filtered by band-pass filter 212, and power-amplified by amplifier 210. Amplifier 210 is a high-powered RF amplifier capable of generating an RF driving signal having a power level of approximately +27 dBm, for example, which is selected to drive the carver modulator 104 of this embodiment. The amplifier 210 also includes an automatic gain control (AGC) input to precisely set the RF driving signal peak-to-peak voltage to a level necessary to optimally drive the carver modulator 104. The band-pass filter 212 is a narrow-band RF filter for producing a pure 5332.1 MHz RF driving signal.

As described above, the processor 110 generates the bias and phase dither signals and the bias and phase adjustment signals 120 and 118. As shown in FIG. 2, the processor 110 comprises an analog-to-digital (A/D) converter 234, a Digital signal processor (DSP) 235, and a digital-to-analog (D/A) converter 236. The processor 110 can comprise individual elements or can be an application specific integrated circuit (ASIC). In one embodiment, the DSP 235 generates a bias dither signal comprising a 2804 Hz audio tone, and a phase dither signal comprising a 1704 Hz audio tone. The audio tones are low-level tones so as not to substantially interfere with the generation of the optical output signal. The frequencies of the dither tones are exemplary. The phase and bias dither signals can have any frequencies that are not harmonically related such that they can be individually detected at the output of the system. The dither frequencies can be, however, harmonically related to the D/A converter 236 sampling frequency.

As described above, the phase and bias dither signals can be introduced and nulled simultaneously or individually. The DSP 235 also generates the bias and phase adjustment signals 120 and 118. The bias and phase dither signals, and the bias and phase adjustment signals, are converted to analog signals via D/A converter 236, and are coupled to bias and phase adders 206 and 218, respectively.

In operation, the photodetector 108 samples the optical output of the system 100 and converts the optical signal to an electrical signal. The electrical signal at the output of the photodetector 108 is coupled to band-pass filters 232. Band-pass filters 232 are two narrow-band RF filters, one for passing an RF signal having a frequency of 2804 Hz (the bias dither signal frequency) and the other for passing an RF signal having a frequency of 1704 Hz (the phase dither signal frequency). The outputs of the band-pass filters 232 are coupled to the A/D converter 234 for input to the DSP 235. The DSP 235 executes an algorithm that distinguishes between phase and bias alignment and anit-alignment and that nulls RF signals having frequencies of 2804 Hz and/or 1704 Hz in order to achieve phase and bias alignment. As described more fully below, if the bias and/or phase dither frequencies are present in the output of the system 100, then a bias and/or phase adjustment is needed to produce complete and undistorted optical pulses in the output signal.

In one embodiment, the RF driving signal produced by the RF driving signal generator 112 is a pure sinusoid $D_r$ that can be represented as:

$$D_r = V_\pi \cos(\omega t + \phi_{bias} + \phi_{error} + d(t)) \qquad \text{Eq. 1}$$

where $\omega$ is the angular frequency of the RF driving signal, $\phi_{bias}$ is the phase Readjustment, $\phi_{error}$ is the phase error, and $d(t)$ is the phase dither signal. In operation, the present invention tracks the phase error and adjusts the phase bias to cancel the phase error. The transfer function H of the carver modulator 104 can be represented as:

$$H = \cos\left(\frac{\pi V}{V_\pi} + \theta_{bias} + \theta_{error} + d_c(t)\right) \qquad \text{Eq. 2}$$

where only the frequency doubling term of the transfer function is shown (i.e., the term that produces pulses at 10 GHz in the present example) and V is the input voltage, $V_\pi$ is the half-wave voltage of the carver modulator 106, $\theta_{bias}$ is the bias adjustment, $\theta_{error}$ is the bias error, and $d_c(t)$ is the bias dither signal. Again, in operation the present invention tracks the bias error and adjusts the bias to cancel the bias error. The optical pulse stream P produced by the carver modulator 104 is thus:

$$P = \cos(\pi D_r + \Theta + d_c(t)) \qquad \text{Eq. 3}$$

where $\Theta$ is the combined bias adjustment and error term that is to be driven to zero.

The 10 GHz modulated component of the RZ optical signal P is:

$$\cos(\pi D_r) \cdot \cos(\Theta + d_c(t)) \qquad \text{Eq. 4}$$

For the low power dither signal $d_c(t)$ that is used, it is sufficient to get its contribution at its frequency by first order expansion. The result is:

$$\cos(\pi D_r) \cdot \{\cos(\Theta) - \sin(\Theta) \cdot d_c(t)\} \qquad \text{Eq. 5}$$

Through second harmonic approximation in the RF driving signal frequency in the first term of Equation 5, Equation 5 can be written as:

$$\{J_0(\pi) - \pi(2J_2(\pi) \cdot \cos(2\omega t + 2\Phi + 2d(t)))\} \cdot \{\cos(\Theta) - \sin(\Theta) \cdot d_c(t)\} \quad \text{Eq. 6}$$

where $\Phi$ is the combined phase bias and phase error term in the RF driver signal that is to be driven to zero, and $J_0$ and $J_2$ are Bessel functions of the first kind of order zero and two, respectively.

From Equation 6, the bias dither signal frequency contribution is:

$$-\sin(\Theta) \cdot d_c(t) \cdot \{X\} \qquad \text{Eq. 7}$$

where X is the DC contribution of the RF driving signal term in the left-hand bracket of Equation 6 (note that only the DC contribution of RF driving signal portion of Equation 6 passes through the photodetector 108 and band-pass filters 232). As shown, the bias dither signal frequency contribution $d_c(t)$ vanishes at bias alignment, where the combination of bias error and adjustment $\Theta$ is zero, and at anti-alignment, where $\Theta$ is $\pi$. Of course, each of these zeros is modulo $2\pi$. Therefore, when the carver modulator 104 is properly biased (that is, the bias error has been properly offset), there is no component of the bias dither signal in the optical output signal. If, however, the bias has shifted, the frequency components of the bias dither signal $d_c(t)$ will has a non-zero amplitude. The photodetector 108 will then detect frequency components of the bias dither signal in the optical output and the processor will adjust the bias adjustment signal to null the detected bias dither frequency components. The slopes of the term in Equation 7 are of opposite sign when approaching optimal bias alignment ($\Theta=0$) and when approaching anti-bias alignment ($\Theta=\pi$). Therefore, the processor 110 can distinguish between the two conditions and avoid anit-alignment.

As for the phase dither signal d(t), its contribution appears in the left-hand term of Equation 6 and can be shown as:

$$\cos(2\omega t + 2\Phi + 2d(t)) = \cos(2\omega t)\cos(2\Phi + 2d(t)) - \sin(2\omega t)\sin(2\Phi + 2d(t)) \qquad \text{Eq. 8}$$

The second term on the right hand side of the equation is anti-symmetric across the period of the data modulator 106 and therefore does not survive the low-pass characteristics of the photodetector 108. Again retaining only the first order terms in the phase dither signal, the d(t) contribution becomes:

$$\cos(2\omega t) \cdot \{\cos(2\Phi) - \sin(2\Phi) \cdot d(t)\} \qquad \text{Eq. 9}$$

After down-conversion and incorporation of the DC contribution from the bias dither signal (only the DC contribution passes through the photodetector 108 and the band-pass filters 232), the contribution of the phase dither frequency is proportional to:

$$-\sin(2\Phi)\cos(\Theta)d(t) \qquad \text{Eq. 10}$$

Alignment of the phase between the optical pulse stream and the NRZ data signal occurs when the phase error and adjustment combination $\Phi$ is zero, and at anti-alignment when $\Phi$ is $\pi/2$. Again, the slope of the term in Equation 10 can be used to avoid the anti-alignment condition, as with the bias dither. The coupling of the bias dither error and offset $\Theta$ is in quadrature with the vanishing at the phase dither frequency. Therefore, when the optical pulse stream at the output of the carver modulator 104 have a proper phase relationship with the NRZ data signal input to the data modulator 106, no components of the phase dither signal frequency are present in the optical output signal. If, however, the phase has shifted, the photodetector 108 will detect frequency components of the phase dither signal in the optical output and the processor will adjust the phase adjustment signal to null the detected phase dither frequency components.

While foregoing is directed to the preferred embodiment of the present invention, other and further embodiments of the invention may be devised without departing from the basic scope thereof, and the scope thereof is determined by the claims that follow.

What is claimed is:

1. An apparatus for transmitting a modulated optical signal comprising:
    a first modulator, for receiving an optical signal as input and being responsive to a radio frequency (RF) driving signal and a DC bias signal to produce an optical pulse stream;
    a second modulator, for modulating the optical pulse stream with a data signal to produce the modulated optical signal; and
    a processor, for dithering the phase of the RF driving signal with a first dither signal, and for dithering the level of the DC bias signal with a second dither signal.

2. The apparatus of claim 1 wherein the processor phase aligns the optical pulse stream with respect to the data signal by adjusting the phase of the RF driving signal to substantially null the first dither signal after the first dither signal is detected in the modulated optical signal, and the processor biases the first modulator by adjusting the level of the DC bias signal to substantially null the second dither signal after the second dither signal is detected in the modulated optical signal.

3. The apparatus of claim 2 wherein the processor adjusts the phase of the RF driving signal and the level of the DC bias signal simultaneously.

4. The apparatus of claim 2 wherein the processor adjusts the phase of the RF driving signal and the level of the DC bias signal individually.

5. The apparatus of claim 2 wherein at least one of the first and second modulators has a first minimum optical output at a first voltage driving level, a second minimum optical output at a second voltage driving level, and a maximum optical output at a voltage level between the first and second voltage levels.

6. The apparatus of claim 5 wherein at least one of the first and second modulators is a Mach-Zehnder modulator.

7. The apparatus of claim 2 wherein the first and second dither signals are low-level audio tones.

8. The apparatus of claim 7 wherein the first dither signal has a frequency of 1704 Hz and the second dither signal has a frequency of 2804 Hz.

9. The apparatus of claim 2 wherein the processor increases the level of at least one of the first and second dither signals as the processor substantially nulls at least one of the first and second dither signals.

10. A method of transmitting a modulated optical signal comprising:
    modulating a continuous optical signal in response to a radio frequency (RF) driving signal and a DC bias signal to produce an optical pulse stream;
    modulating the optical pulse stream with a data signal to produce the modulated optical signal;
    dithering the phase of the RF driving signal with a first dither signal; and
    dithering the level of the DC bias signal with a second dither signal.

11. The method of claim 10 further comprising:
    adjusting the phase of the RF driving signal to substantially null the first dither signal after the first dither signal is detected in the modulated optical signal for aligning the phase of the optical pulse stream with respect to the electrical data signal; and
    adjusting the level of the DC bias signal to substantially null the second dither signal after the second dither signal is detected in the modulated optical signal.

12. The method of claim 11 wherein the steps of adjusting the phase of the RF driving signal and adjusting the level of the DC bias signal are performed simultaneously.

13. The method of claim 11 wherein the steps of adjusting the phase of the RF driving signal and adjusting the level of the DC bias signal are performed individually.

14. The method of claim 11 wherein the first and second dither signals are low-level audio tones.

15. The method of claim 14 wherein the first dither signal has a frequency of 1704 Hz and the second dither signal has a frequency of 2804 Hz.

16. The method of claim 11 further comprising increasing the level of at least one of the first and second dither signals while at least one of the first and second dither signal is being substantially nulled.

17. An apparatus for transmitting a modulated optical signal comprising:

a first Mach-Zehnder modulator, for receiving a optical signal and being responsive to a radio frequency (RF) driving signal and a DC bias signal to produce therefrom an optical pulse stream;

a second Mach-Zehner modulator, for modulating the optical pulse stream with a data signal to produce the modulated optical signal; and a digital signal processor, for dithering the phase of the RF driving signal with a first dither signal and dithering the level of the DC bias signal with a second dither signal;

wherein the digital signal processor phase aligns the optical pulse stream with respect to the data signal by adjusting the phase of the RF driving signal to substantially null the first dither signal after the first dither signal is detected in the modulated optical signal, and the processor biases the first modulator by adjusting the level of the DC bias signal to substantially null the second dither signal after the second dither signal is detected in the modulated optical signal.

18. The apparatus of claim 17 wherein the first and second dither signals are low-level audio tones.

19. The apparatus of claim 18 wherein the first dither signal has a frequency of 1704 Hz and the second dither signal has a frequency of 2804 Hz.

20. The apparatus of claim 18 wherein the digital signal processor increases the level of at least one of the first and second dither signals as the processor substantially nulls at least one of the first and second dither signals.

* * * * *